Feb. 26, 1924.
F. J. MONAHAN ET AL
1,484,841
TRENCH EXCAVATOR
Filed Dec. 21, 1918   9 Sheets-Sheet 1
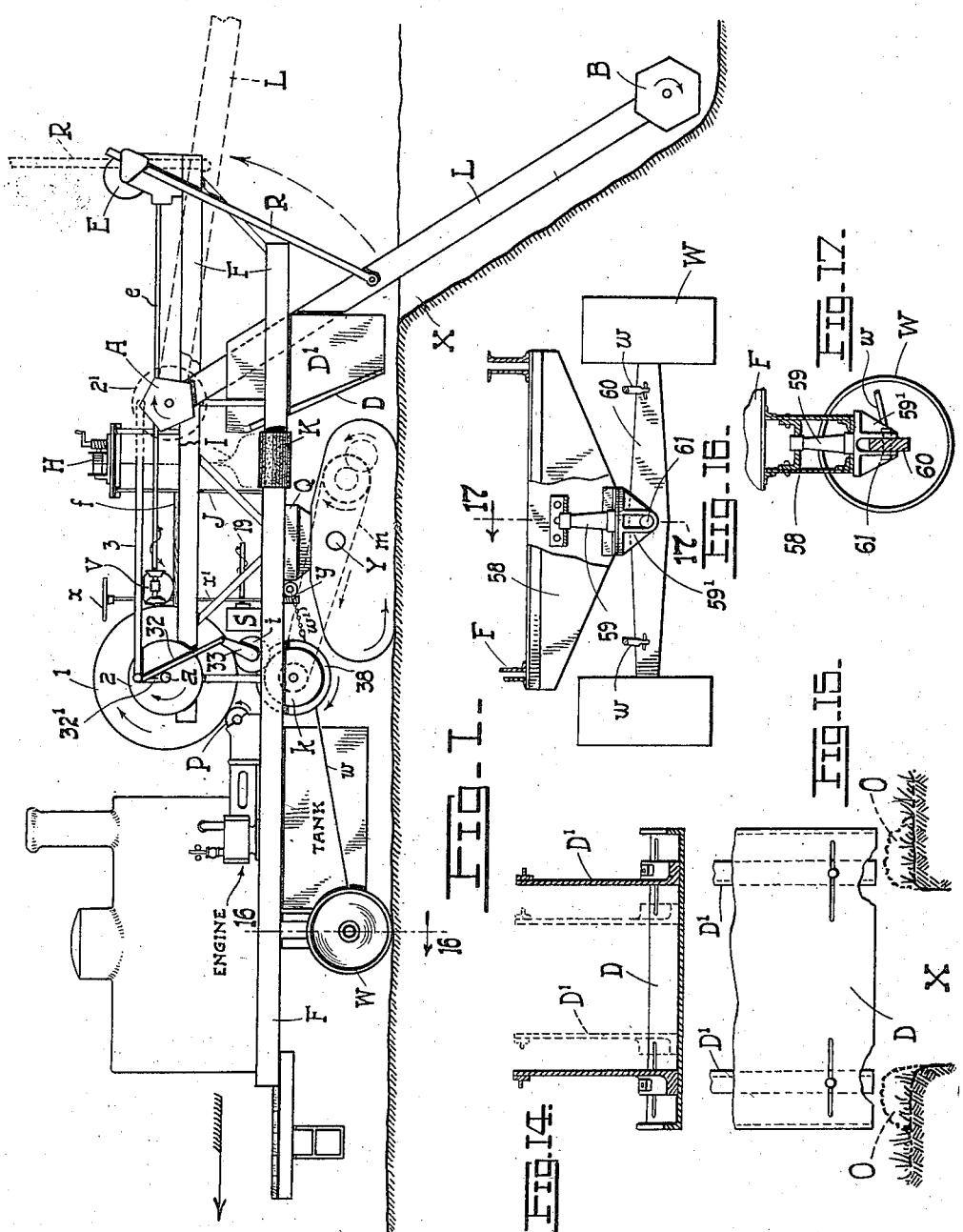
WITNESSES:
INVENTORS:
Frank J. Monahan,
Walter Ferris and
Werner Lehman.
BY
ATTORNEYS Feb. 26, 1924. 1,484,841
F. J. MONAHAN ET AL
TRENCH EXCAVATOR
Filed Dec. 21, 1918 9 Sheets-Sheet 2
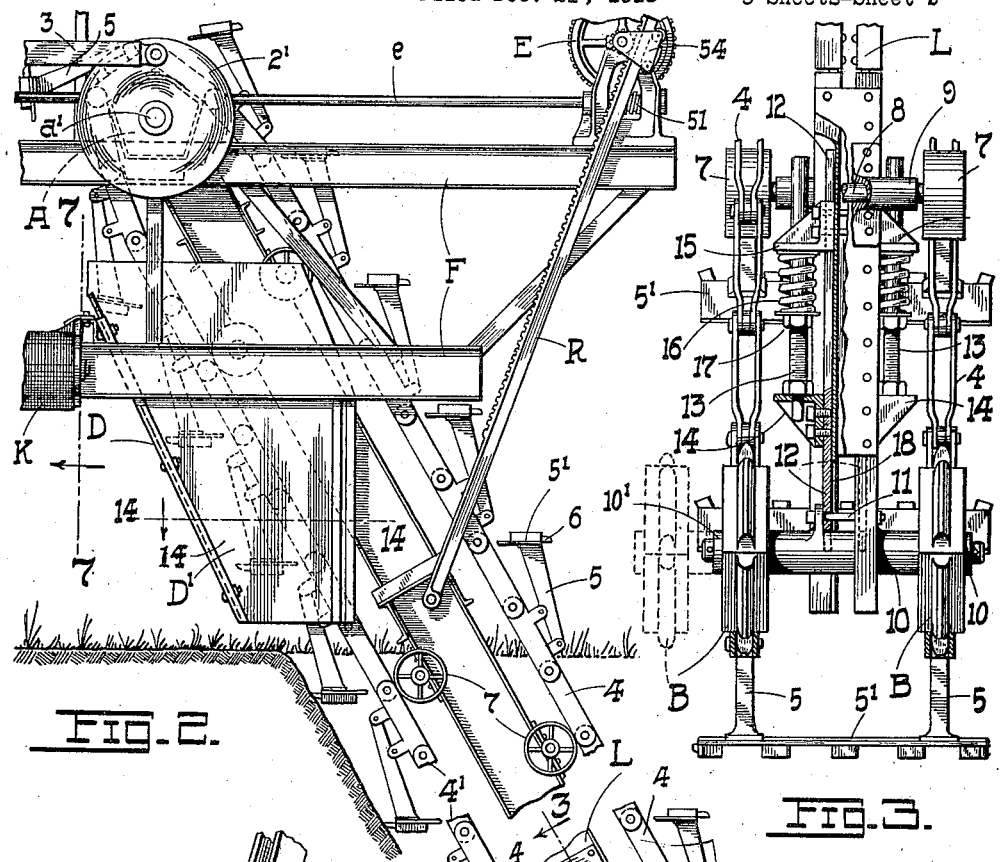
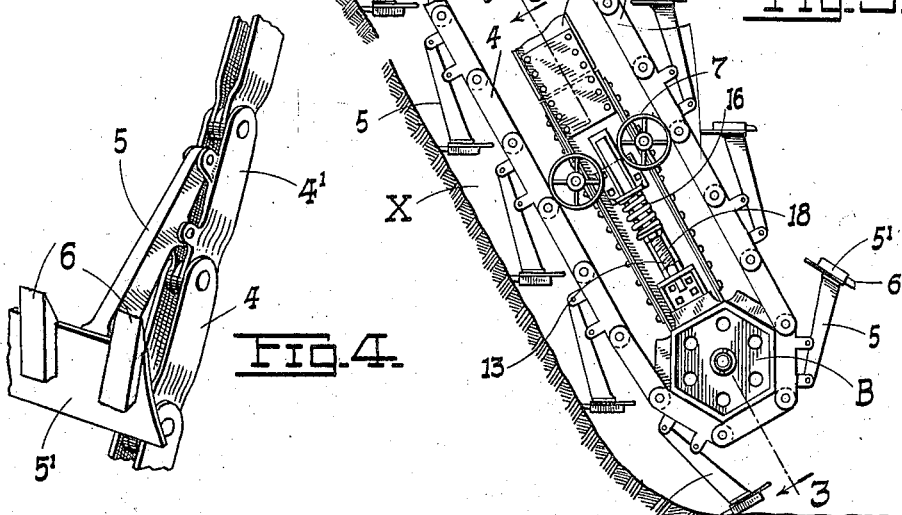
WITNESSES:
Phil J. Nawy
Walter Hehn
INVENTORS:
Frank J. Monahan,
Walter Ferris and
Werner Lehman.
BY Parker & Carter
ATTORNEYS.

Feb. 26, 1924.
F. J. MONAHAN ET AL
1,484,841
TRENCH EXCAVATOR
Filed Dec. 21, 1918  9 Sheets-Sheet 3
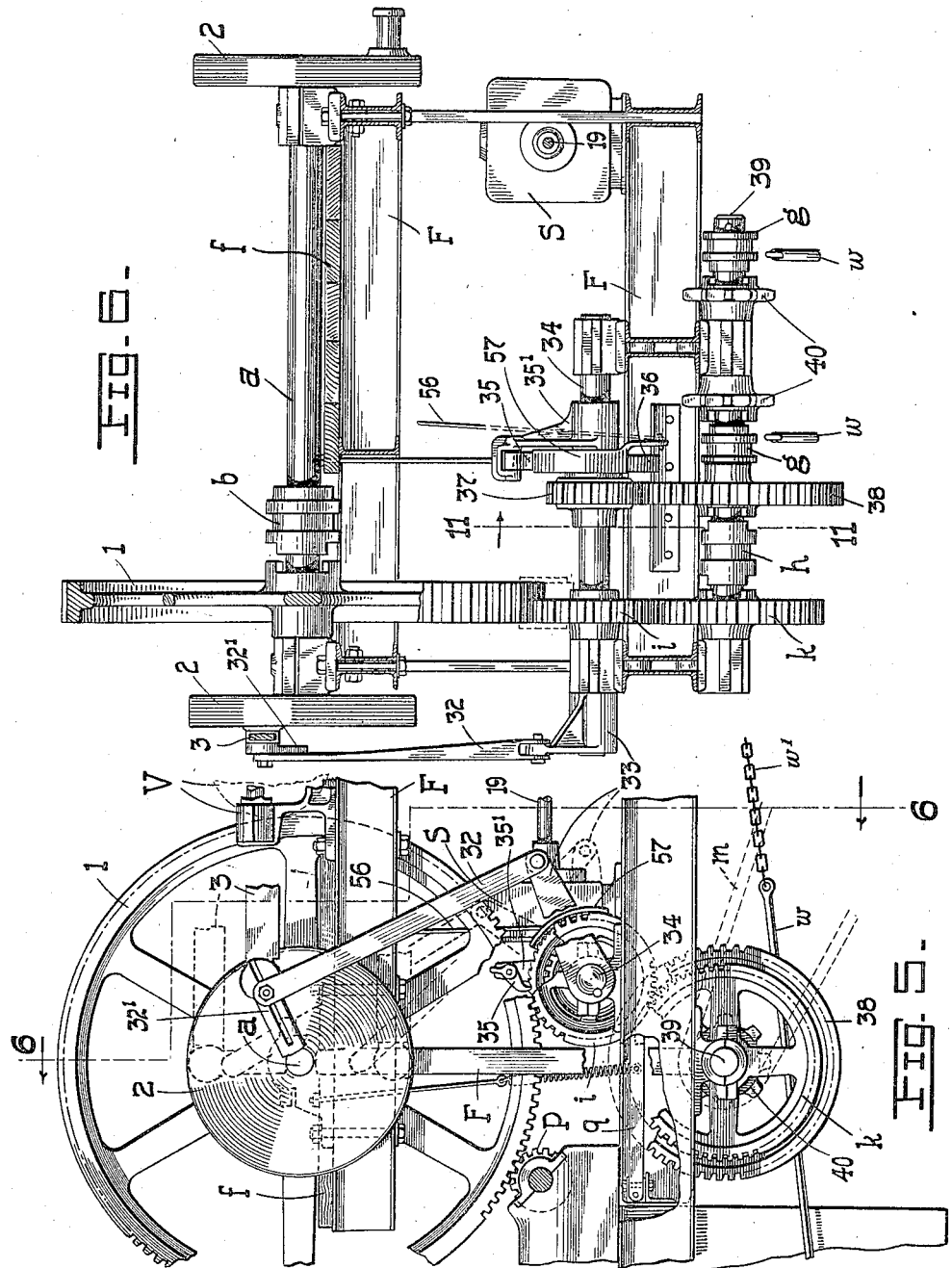
WITNESSES:
Phil J. Nawn
Walter Plehn
INVENTORS:
Frank J. Monahan,
Walter Ferris and
Werner Lehman
BY
Parker & Carter
ATTORNEYS.

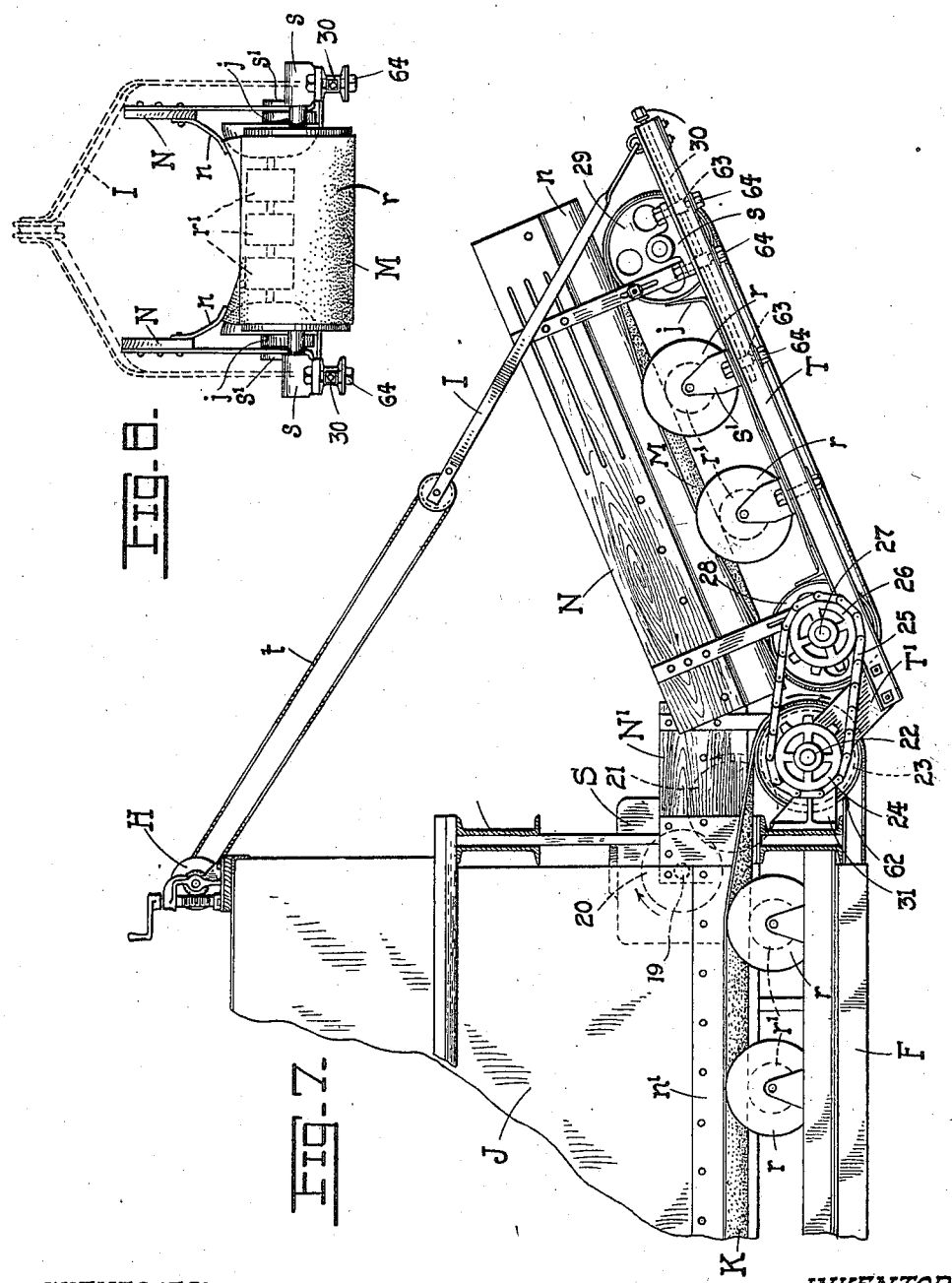

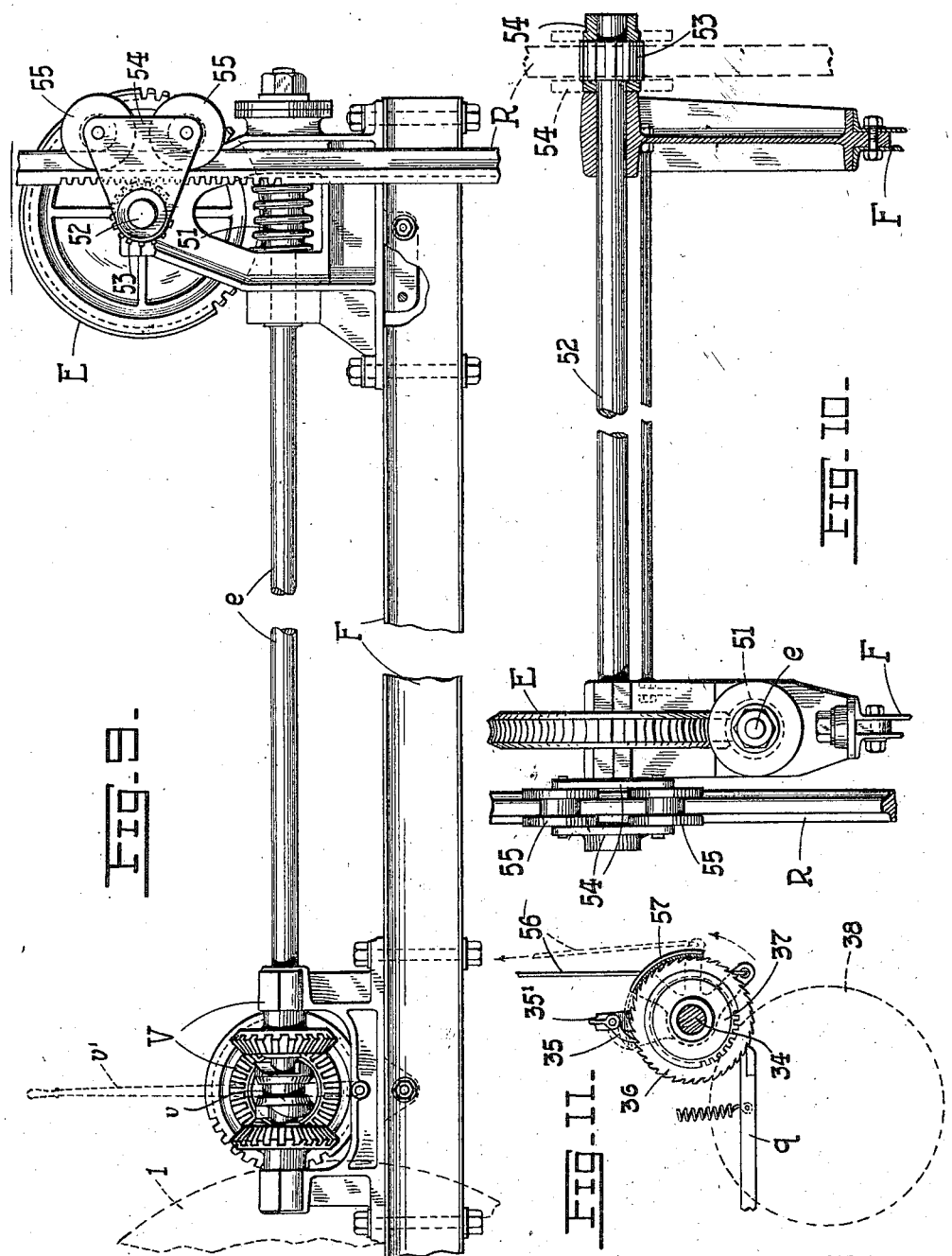

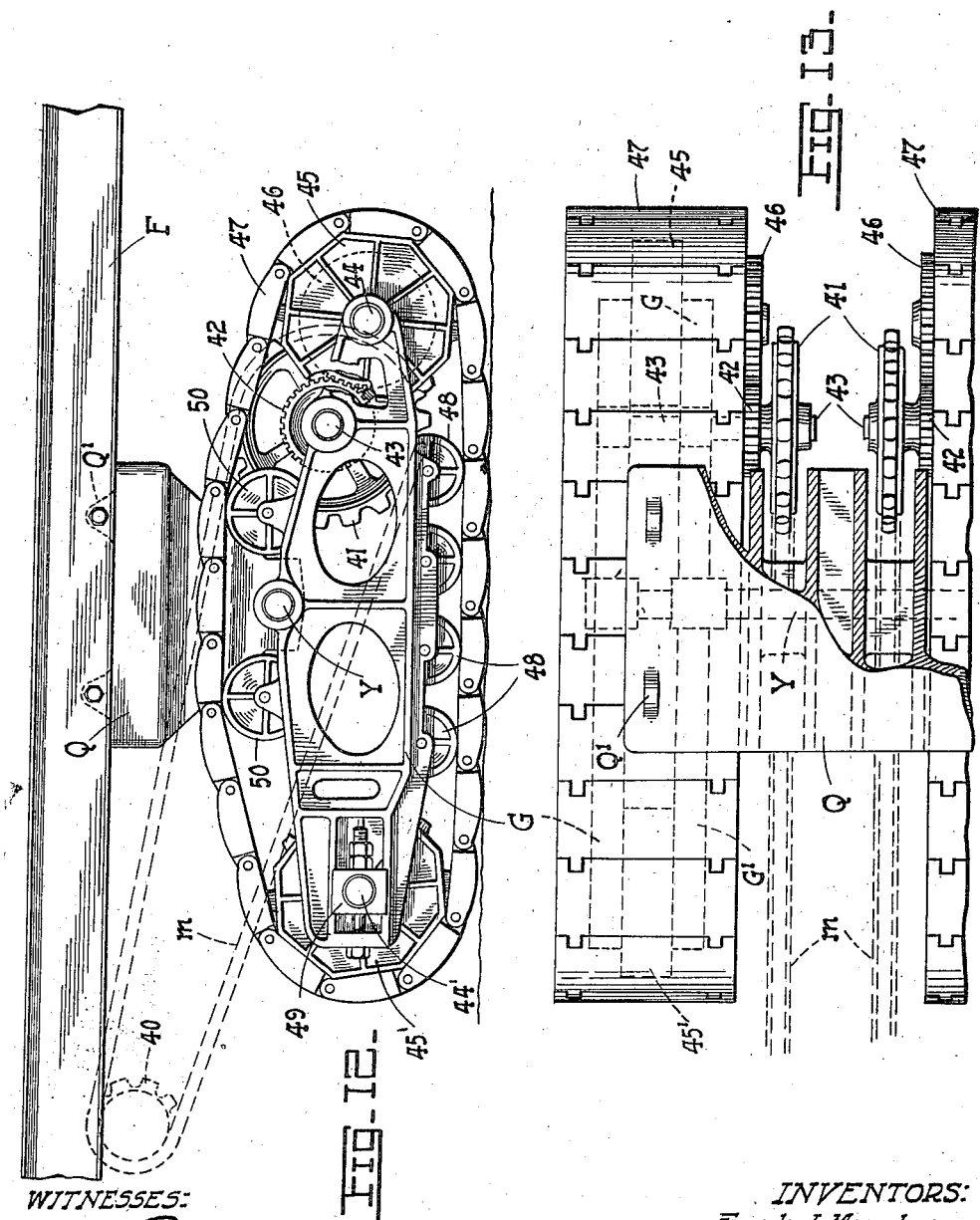

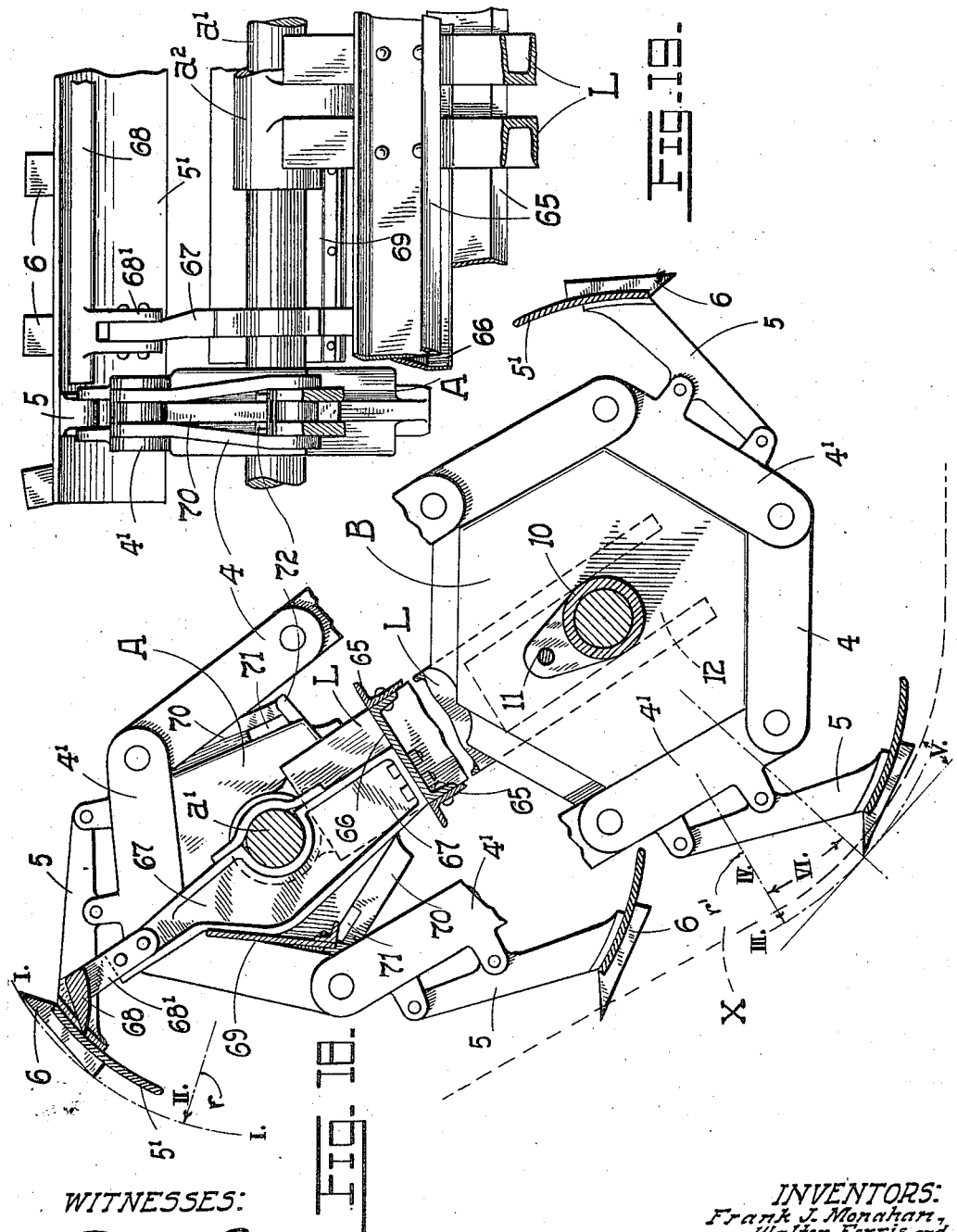

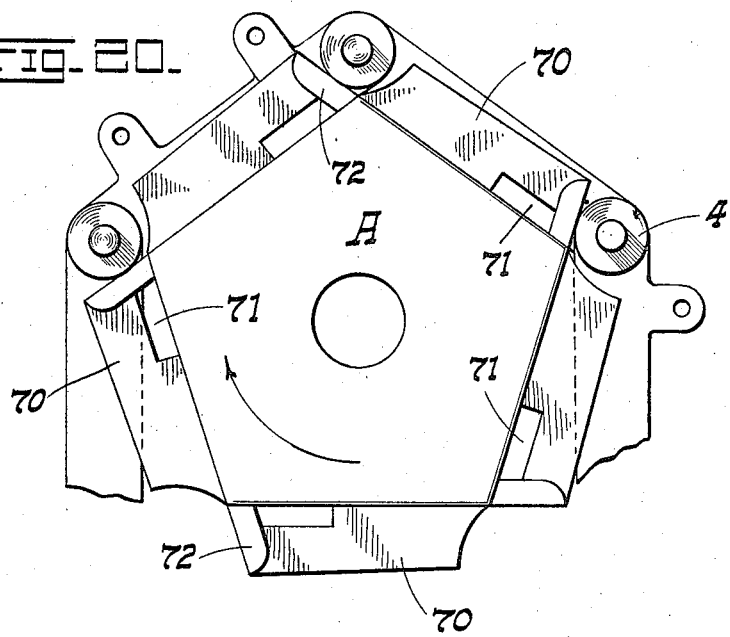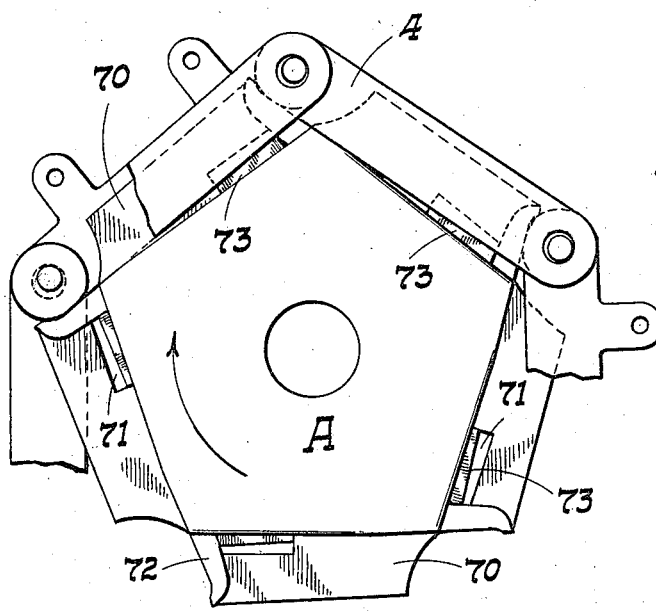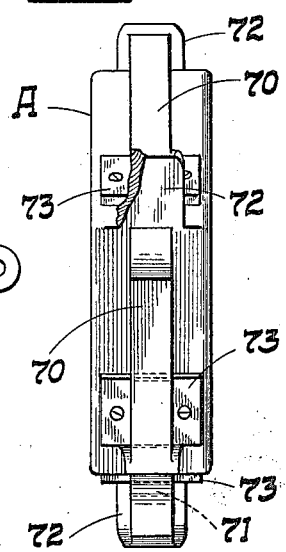

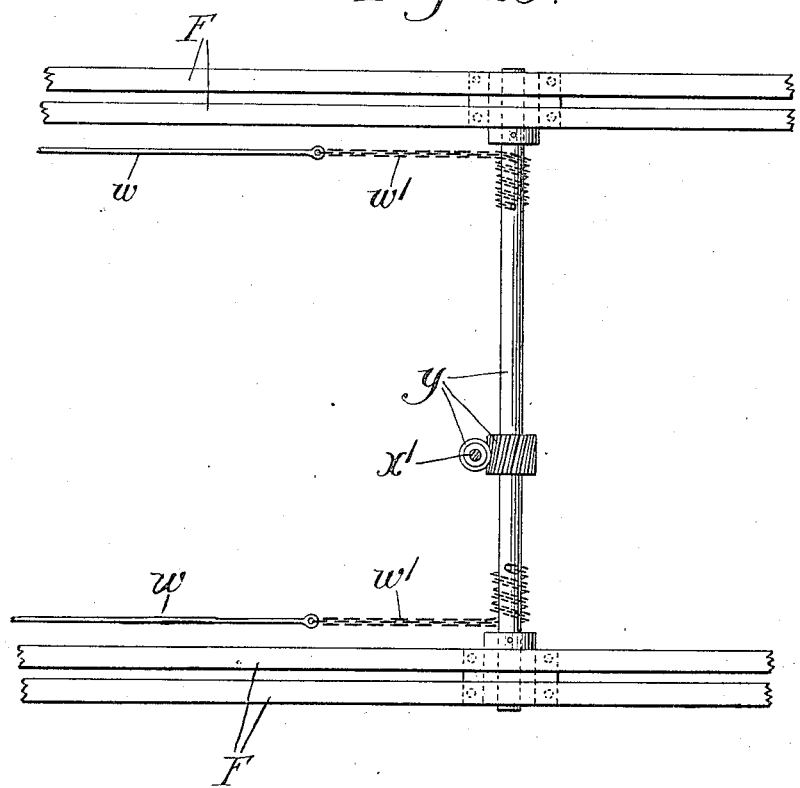

Patented Feb. 26, 1924.                                              1,484,841

UNITED STATES PATENT OFFICE.

FRANK J. MONAHAN, OF JOLIET, ILLINOIS, AND WALTER FERRIS, OF MILWAUKEE, AND WERNER LEHMAN, OF SOUTH MILWAUKEE, WISCONSIN, ASSIGNORS TO BUCYRUS COMPANY, OF SOUTH MILWAUKEE, WISCONSIN, A CORPORATION OF WISCONSIN.

TRENCH EXCAVATOR.

Application filed December 21, 1918. Serial No. 267,763.

*To all whom it may concern:*

Be it known that we, FRANK J. MONAHAN, WALTER FERRIS, and WERNER LEHMAN, being citizens of the United States, and residents of Joliet, in the county of Will and the State of Illinois, and of Milwaukee and South Milwaukee, respectively, in the county of Milwaukee and State of Wisconsin (whose post-office address is care of Bucyrus Company, South Milwaukee, Wisconsin), have invented a certain new and useful Improvement in Trench Excavators, of which the following is a specification.

Our invention relates to an improvement in trench excavators such as are used for the digging of ditches, sewers, narrow canals, trenches and the like where the earth is free from stones and boulders of large size.

Among the objects of our invention are provided new and improved apparatus for controlling the speed and the depth and the width of the cut, for making a cut in contour and design more or less independent of the contour of the ground over which the apparatus travels, and to provide means to cushion and minimize the bounding effect caused by the entrance into the earth of the digging elements in a continuous excavator. Other objects of our invention will appear from time to time in the specification.

Our invention comprises, therefore, a rigid base frame, provided with a three point support at the rear and front. It is carried between a pair of supporting caterpillar structures at the rear and, at the front on a king-bolt, which in turn rests upon a wheel truck. Means are provided for steering by manipulation of the wheel truck, and for propelling, by driving the tractors. The excavating ladder extends to the rear and downwardly behind the tractors and, a suitable source of power is mounted upon the main base.

Our invention is illustrated more or less diagrammatically in the accompanying drawings wherein—

Figure 1 is a diagrammatic side elevation:

Figure 2 is an enlarged detail of the digging conveyor and associated parts;

Figure 3 is a section along the line 3—3 of Figure 2;

Figure 4 is a perspective of the digging element;

Figure 5 is a detail of the operating mechanism;

Figure 6 is a section along the line 6—6 of Figure 5;

Figure 7 is a section along the line 7—7 of Figure 2, with side delivery conveyor in position;

Figure 8 is an end elevation of the side conveyor;

Figure 9 is a detail of the conveyor elevating mechanism;

Figure 10 is an end view in part section of Figure 9;

Figure 11 is a section along the line 11—11 of Figure 6;

Figure 12 is a detail of one of the caterpillar members;

Figure 13 is a plan view in part section of the members shown in Figure 12;

Figure 14 is a section view along the line 14—14 of Figure 2 through the apron only;

Figure 15 is a rear view of Figure 14 showing the relation of apron to truck;

Figure 16 is a section along the line 16—16 of Figure 1;

Figure 17 is a section along the line 17—17 of Figure 16;

Figure 18 is a detailed sectional elevation through the digging conveyor showing bucket cleaning arrangement;

Figure 19 is a detailed front view of a part of Figure 18;

Figures 20, 21 and 22 are details showing the relation between the sprocket at the upper end of the digging conveyor and the chain which passes over it;

Fig. 23 is a fragmentary sectional view showing a portion of the steering mechanism.

Like parts are indicated by like characters in all the drawings.

F is the main frame. It is built with two stories or levels to carry the operating mechanism and power plant. It is supported at its forward end on steering wheels W. P is a pinion driven by the engine. It drives the gear 1 which is loosely mounted on shaft $a$ but is adapted to drive it through a clutch $b$ keyed thereto. This clutch will be disengaged in normal operation but will be used to propel the apparatus when digging is not going on.

2—2 are crank discs mounted one at each end of the driving shaft $a$. $2^1$ $2^1$ are driving discs mounted one at each end of the shaft $a^1$ and located at the upper end of the excavating ladder. The discs $2^1$ $2^1$ are driven by means of the driving rods 3—3 from the discs 2—2, the pair on one side of the apparatus being spaced 90° from the pair on the other side. The shaft $a^1$ carries tumbler sprocket wheels A over which passes the excavating chain.

L is the digging conveyor support. It extends downwardly from the rear of the main frame F being pivotally mounted on shaft $a^1$. On the lower end of the conveyer support are mounted tumbler sprocket wheels B—B having a greater pitch diameter than the tumbler sprockets A. Over these sprockets A and B pass the endless chains 4, having spaced along their length links $4^1$ adapted to receive arms 5 of the digging elements or cutting teeth which arms have rigidly connected to them buckets $5^1$ toothed at 6, which teeth plow up the earth of the trench so that the earth may be scraped up the bank to the point at which it is dumped upon the conveyor belt K.

The chains 4, 4 travel along idlers 7 placed along the digging conveyor support L, and over the tumblers B, at the lower end of the conveyor support which were provided with a tension arrangement by which the digging line is kept parallel to the bank of the trench X. The tumblers B, B are carried by the interchangeable shafts of different length by the use of which the distance between the chains may be varied to provide for the excavation of trenches of different width. The sleeve 10 and collars $10^1$, being provided to properly position the tumblers on the different shafts. The sleeve 10 is mounted on lugs and gauging, sliding plates 12 and held thereupon by means of bolt 11, whereby a yielding support is provided which cushions the lower end of the digging chain. Adjustable screws 13 engage the brackets 14 on the sliding plates 12 and pass loosely through a similar bracket 15 which is adapted to saddle the sliding plate 12 and is fastened rigidly to the conveyor support L to provide an abutment against which the cushioning springs 16 bear. An adjusting nut 17 regulates the tension of the chains allowing the sleeve 10 to reciprocate in the fork 18 cut in the channels of the digging conveyor support L.

The earth is dumped from the buckets $5^1$ as they pass around the tumbler A which is preferably pentagonal in form, and, as a result of the speed at which the train travels, the buckets receive, at this point, a bump or sudden jar which assists in shaking off the earth which falls upon the conveyor belt K, thence to the belt M of the side delivery T, which is pivotally connected to the shaft 22 by the member $T^1$. The earth is prevented from falling among the machine parts by a partition J and confined to travel on the belts K and M by the guards N, $N^1$ $n$ and $n^1$.

The conveyor belt is driven in the direction indicated by the arrows, by an auxiliary motor or engine S whose shaft 19 has a gear 20 in mesh with an intermediate gear-wheel 21 which rotates in mesh with the gear 23 rigidly mounted on the shaft 22, (this train of gears being shown dotted,) which has also rigidly mounted thereon the sprockets 24 and a belt drum over which passes the belt K, this unit being journalled in a bracket 31. A sprocket chain 25 passing over the sprocket wheels 24 and 26 mounted on the shaft 27 drives the belt M which travels about the drums 28 and 29. Tension in the belt M is maintained by adjusting the slidable bearings $s$, $s'$ by the screw 30 which passes through the trunnions 63 shown dotted and held stationary by the nuts 64. The trough formation given the belts or conveyors K and M is obtained by using on either side the truncated rolls $r$, and a series of smaller rolls $r'$ on the same shaft between said rolls $r$. Means for keeping out the dirt from between the laps of the conveyors is provided by the plate or apron $j$, and the scraper 62. A shackle I fastened to the side delivery T is adapted to raise or lower it by means of a hoist H and tackle $t$.

The connecting link 32 imparts an oscillating motion to the crank arm 33 rocking the shaft 34 on which is keyed the casting $35'$ carrying the pawl 35 which advances the ratchet-wheel 36, each advance being retained by the keeping-pawl $q$, said ratchet being a unit with the pinion 37 in mesh with the gear 38 loosely mounted on the shaft 39.

On the shaft 39 are keyed the clutches $g$, $g$, and $h$, which engage, for traction purposes, the gear 38 and the pinion sprockets 40. When it is desired that a faster speed be used in propelling the machine to another location, the ratchet 36 is released and the clutch $h$ is put in mesh with the gear $h$ which, through the intermediate gear $i$ is geared to the drive-gear 1. This is accomplished by throwing the pawl 35 out of engagement with the ratchet 36 by means of the rod 56, pulled in direction of arrow, thereby rocking the releasing hood 57 under the pawl 35 leaving the ratchet 35 and pinion 37 free to revolve with the gear 38. Intermediate positions of hood reduce the effective contact of pawl 35 with ratchet wheel 36, and thus enable the operator to change the feed while digging. The feed may also be changed by positioning the crank pin at upper end of rod 32 in slot $32'$ of crank disc 2.

The drive for the caterpillar traction arrangement is provided by the chains $m$ passing around the pinion sprockets 40 and over the sprockets 41 which are integral with the pinions 42 mounted on the studs 43.

The side frames G are arranged in two pairs; between each pair are mounted the shafts 44 which carry the drum sprockets 45 and the gear 46 which is meshed with the pinion 42, all preferably mounted at the rear of the caterpillar arrangement. A similar construction minus the gears is located in the front end of the caterpillars in which the drums 45' are mounted on the shaft 44' and said shaft being journalled in the adjustable bearing 49 provides a means for adjusting the caterpillar chain 47. Over the drums 45 and 44 passes an endless chain 47 whose lower reach receives the weight of the machine through frames G and the rolls 48 and whose upper reach is supported by the rolls 50. The caterpillar units are yoked together by the casting Q having a ribbed formation for passage of chains m and having journalled to its side the rocking pin Y which is mounted in bearings centrally located on the upper edges of the castings G, thereby permitting the caterpillars to rock and accommodate irregularities of the ground. The upper face of the casting Q has the lugs Q' which are adapted to be embraced by the channel iron sills of the framework F.

The digging conveyor support L can be lowered or raised at will by the reversing level gears V which are actuated from the drive wheel 1 and imparts rotation in either direction to the shaft C by shifting the clutch v which is controlled by the lever v'. The worm 51 meshes with the worm-wheel E rigidly mounted on the shaft 52 journalled on the framework F and having keyed thereto the pinions 53. Pivoted to the shaft 52 are the yokes 54 having mounted in them the rolls 55 between which and the pinions 53 moves the rack arms R which are geared to the pinion 53 and serve to support the digging ladder L at any desired angle.

As the earth removed in digging is carried above the surface, it is prevented from falling beyond the lines of the trench by an apron D having adjustable sides D' that can be positioned so as to avoid any formation of ridges O along the trench sides, such ridges are indicated by dotted lines at O in Fig. 15, and the object of this improvement is to prevent their formation, and subsequent caving into the trench.

Steering is effected through the worm, worm wheel and shaft assembly y, which can be operated by hand from the platform f, by means of the hand wheel x and stem x' for taking up and letting out the chains w' wound under and over the shaft of the assembly y in order to move the front steering wheels W.

To accommodate the caterpillar feature to the curve or circle described by the front truck, the respective clutches g, g are provided one, imparting motion through the sprockets 40, the chains m and the sprocket wheels 41 thereby revolving in any desired direction either units of the caterpillar. The clutches b, g, g and h are moved by hand as desired.

The front truck is composed of a bolster 58 upon which the framework F rests. A casting with a king-bolt formation 59 rises out of a circular flange which serves as a fifth wheel. Beneath the flange depends a forked clip portion 59' which straddles the axle 60 and is maintained in its position by the pin 61 passing through said axle 60 on which are mounted the traction wheels W.

The removal of the earth from the buckets 5' is effected at the upper end of the digging conveyor support L. The angle irons 65, being part of the structure at that point, have the member 66 between them and to this is bolted the arm 67 which is shaped to allow the shaft $a'$ to pass through. A scraper 68 having the forks 68', adapted to fit over and be fixed to the arms 67, is so disposed, with reference to the shaft $a'$ that the circular inner surface of the bucket in its path over the tumbler A passes close to the scraping edge, allowing the scraper 68 to clean the carrying surface of the bucket 5'. An apron or shield plate 69 is fastened to the arms 67 and prevents the falling dirt from dropping back beyond the conveyor belt.

It will be observed, with special reference to Fig. 18, that the radius II. from the center of the upper tumbler shaft to the arc I. I. drawn tangent to the point of the bucket tooth as it revolves around the upper tumbler, is less than the radius IV. of the arc III. drawn tangent to the point of a bucket tooth during its passage around the lower tumbler and entrance into the digging position. This increase in radius at the lower tumbler is effected in the present instance by using a six sided sprocket for the lower tumbler and a five sided sprocket for the upper tumbler. It might equally well be effected by using a circular lower tumbler of equivalent pitch diameter to the six sided sprocket, the essential point being that the radius at which the digging points of the teeth 6 pass around the lower tumbler is larger than their radius at the upper tumbler. It has already been explained that the inner face of the digging bucket $5^1$ is concentric as it passes around the upper tumbler. It is necessary that this face should not be concentric as it passes around the lower tumbler, because in such case, the after part of the heel of the tooth 6 would drag upon the surface to be excavated, as is clearly shown by the location of the arc I. I. drawn concentric with the upper tumbler shaft. The purpose of the increase in the lower tumbler diameter is to attain a clearance at the heels of the teeth as clearly shown by inspection of the arc III. drawn concentric with the lower tumbler shaft. It will also be noted that the radius $r^1$ of this arc is drawn through the center of that face of the lower tumbler which supports the bucket indicated while the bucket arm 5 is so proportioned as to bring the point of the digging tooth at a considerable angle VI. back of the center of the tumbler face which supports the bucket under consideration. It is obvious that a part of the clearance angle V. is due to the mere increase from radius $r$ at the upper tumbler to $r^1$ at the lower tumbler; but the larger part of the clearance angle is due to the fact that the point of the tooth is not located on the radius LV. along which the link $4^1$ and bucket carried by it are shifted in consequence of the greater diameter of the lower tumbler sprocket. The larger part of the clearance is due to the fact that the bucket tooth point is located back of the radius IV., which makes the increase in the clearance angle V. much greater for unit of increase in radius IV. Therefore, with a bucket formed to be cleaned by a stationary radial scraper as it passes around the upper tumbler, it is expedient to have the lower tumbler of larger radius than the upper tumbler and have the digging radius set back as described in order to obtain the proper digging clearance as the bucket passes around the lower tumbler.

Referring to Figures 20 and 21, it will be noted that the outwardly projecting lugs 70 on the tumbler penetrate the successive links on the chain in the usual manner and that so long as the chain is of the proper pitch length, it will fit in the pockets between the ends in the proper way, but if the chain shows signs of wear as illustrated in Figure 21, then the lengths will fit loosely and unsatisfactorily on the sprocket or tumbler and there will be vibration and slipping of the chain during work. In order to obviate this difficulty, I provide the spacer blocks 73 which may be passed through the sprockets 71 and screwed in position on the face of the tumbler. The arms of these spacer blocks projecting outwardly as they do, from either side of the lug 70, lie beneath the face of the tumbler and the chain links and compel the forward end of each link to ride up on the face of the lug 70, thus in effect, increasing the pitch diameter of the tumbler. Various thicknesses of blocks may be used at the will of the operator so as to get various pitch diameters so as to take care of various widths of chain.

We claim:—

1. In an excavating machine a chain having curved projecting buckets, upper and lower tumblers about which the chain travels, and a scraper associated with the upper one, the diameter of which is such that as each successive bucket passes around it, the inner surface thereof is brought into working engagement with the scraper, the radius of the lower tumbler being such that as successive buckets pass around, the curved surfaces are inwardly and rearwardly inclined from the circle described by the cutting edge of each bucket as it passes around.

2. In a digging mechanism, a polygonal tumbler and excavating chain thereover, the chain links being arranged to rest upon and fit corresponding tumbler faces, said tumbler faces being adjustable, and means for adjusting them to compensate for wear in the working parts.

3. In a digging mechanism, a polygonal tumbler and excavating chain thereover, the chain links being arranged to rest upon and fit corresponding tumbler faces, said tumbler faces being adjustable, and means for adjusting them to compensate for wear in the working parts, said means comprising shims attached to the tumbler faces and located beneath the leading ends of the chain links as they travel about the tumbler.

4. In a digging mechanism, an excavating chain and polygonal tumbler, the faces of which are adapted to engage and fit separate chain links and means carried by the tumblers for compensating for wear of the parts by increasing the pitch of the tumbler.

5. In a digging mechanism, an excavating chain and polygonal tumbler, the faces of which are adapted to engage and fit separate chain links and means carried by the tumblers for compensating for wear of the parts by increasing the pitch of the tumbler, said means comprising shims interposed between a part of each tumbler face and the link resting thereupon.

6. In a digging mechanism, an excavating chain and polygonal tumbler, the faces of which are adapted to engage and fit separate chain links and means carried by the tumblers for compensating for wear of the parts by increasing the pitch of the tumbler, said means comprising shims interposed between a part of each tumbler face and the link resting thereupon, said shims being located adjacent that part of the tumbler face where the pressure of the link is minimum.

7. A digging mechanism comprising a polygonal tumbler, a chain whose respective links fit upon corresponding tumbler faces, and shims attached to the respective tumbler faces under the leading ends of the chain links, whereby wear in the various parts may be compensated and a fit of the chain links upon the tumbler faces maintained.

8. In an excavating machine, a chain having projecting buckets, the elements of whose inner surfaces are circular arcs, upper and lower tumblers about which the chain travels, and a scraper associated with the upper one, the diameter of the upper tumbler being such that as each successive bucket passes around it, the curved inner surface of the bucket is coaxial with said upper tumbler, the diameter of the lower tumbler being such that as successive buckets pass around it, their curved surfaces are inwardly and rearwardly inclined from the circle described by their cutting edges.

9. In an excavating machine, a chain having curved projecting buckets, upper and lower polygonal tumblers about which the chain travels, and a scraper associated with the upper one, the diameter of the upper tumbler being such that as each successive bucket passes around it, the curved inner surface of the bucket is coaxial with said upper tumbler, the diameter of the lower tumbler being such that as successive buckets pass around it, their curved surfaces are inwardly and rearwardly inclined from the circle described by their cutting edges.

10. In an excavating machine, a chain having curved projecting buckets, upper and lower polygonal tumblers about which the chain travels, and a scraper associated with the upper one, the diameter of the upper tumbler being such that as each successive bucket passes around it, the inner curved surface of the bucket is brought into working engagement with the scraper, the diameter of the lower tumbler being such that as successive buckets pass around it, their curved surfaces are inwardly and rearwardly inclined from the circle described by their cutting edges.

11. In an excavating machine, a chain having curved projecting buckets, upper and lower polygonal tumblers about which the chain travels, and a scraper associated with the upper tumbler, the diameter of the upper tumbler being such that as each successive bucket passes around it, the curved inner surface of the bucket is brought into working engagement with the scraper, the diameter of the lower tumbler being such that as successive buckets pass around it, their curved surfaces are inwardly and rearwardly inclined from the circle described by their cutting edges, the length of each tumbler face being such as to engage one link of the chain.

12. In an excavating machine, a continuous chain having projecting digging buckets, tumblers over which it travels, a scraper adapted to clean the buckets, adjacent one of said tumblers, the other tumbler being of larger diameter than the tumbler adjacent to the scraper, said diameters being such as to provide for the inclination of the buckets at the proper angle for scraping adjacent the smaller tumbler, and at the proper angle for digging adjacent the larger tumbler.

13. In an excavating machine, a continuous chain having projecting digging buckets, a scraper adapted to clean the buckets, polygonal tumblers upon which said chain travels, the tumbler at the excavating end having a larger number of sides than the tumbler at the scraper end, each tumbler side being adapted to fit one chain link, whereby the buckets are inclined at the proper angle for scraping adjacent the smaller tumbler, and at the proper angle for digging adjacent the larger tumbler.

14. In an excavating machine, a continuous chain having projecting, digging buckets, tumblers about which said chain travels, a scraper adjacent one of said tumblers adapted to contact the interior of each bucket as it passes about said tumbler, means for holding the chain in operative position, and means for positioning the buckets for scraping as they pass about one tumbler and for digging as they pass about the other, comprising means for inclining said buckets in different angular relation to the planes tangential to the arcs described by said buckets as they rotate about the axes of the respective tumblers.

15. In an excavating machine, a continuous digging chain comprising a series of pivoted links, a tumbler at either end thereof over which said chain travels, cutting elements supported from a plurality of said links, a scraper adjacent one of said tumblers adapted to clean said cutting elements as they pass about said tumbler, the other tumbler being of larger diameter than the tumbler adjacent the scraper.

16. In an excavating machine, a continuous digging chain comprising a series of pivoted links, a tumbler at either end thereof over which said chain travels, cutting elements supported from a plurality of said links extending rearwardly therefrom opposite the link next following, but out of contact therewith, a scraper adjacent one of said tumblers adapted to clean said cutting elements as they pass about said tumbler, the other tumbler being of larger diameter than the tumbler adjacent the scraper.

Signed at South Milwaukee, Wisconsin, this second day of December, 1918.

WALTER FERRIS.

Witnesses for Walter Ferris:
    KATHRYN O'CONNELL,
    WALTER PLEHN.

WERNER LEHMAN.

Witnesses for Werner Lehman:
    T. NORSTROM,
    F. A. BLAKESLEE.

Signed at Joliet, Illinois, this 30th day of November, 1918.

FRANK J. MONAHAN.

Witnesses for Frank J. Monahan:
    S. N. McPHERSON,
    W. J. GILPIN.